United States Patent [19]

Beamer

[11] Patent Number: 4,756,558
[45] Date of Patent: Jul. 12, 1988

[54] QUICK CONNECT TUBE COUPLING

[75] Inventor: Henry E. Beamer, Middleport, N.Y.

[73] Assignee: General Motors Corporation, Detroit, Mich.

[21] Appl. No.: 66,115

[22] Filed: Jun. 25, 1987

[51] Int. Cl.⁴ .......................... F16L 5/02; F16L 37/12
[52] U.S. Cl. ...................................... 285/39; 285/159; 285/319; 285/921
[58] Field of Search ................. 285/319, 39, 921, 159

[56] References Cited

U.S. PATENT DOCUMENTS

| Re. 25,765 | 4/1965 | Ankney | 285/921 X |
| 2,550,591 | 4/1951 | Parsons | 285/319 |
| 3,826,523 | 7/1974 | Eschbaugh | 285/39 |
| 4,035,005 | 7/1977 | DeVincent et al. | 285/319 |
| 4,036,515 | 7/1977 | Karcher et al. | 285/319 X |
| 4,508,374 | 4/1985 | Kantor | 285/319 |
| 4,673,200 | 6/1987 | Miyauchi | 285/319 |

Primary Examiner—Thomas F. Callaghan
Attorney, Agent, or Firm—R. L. Phillips

[57] ABSTRACT

A quick connect tube coupling has a connector body with an external threaded portion and a passage extending therethrough. A sheet metal nut and tube retainer member has an opening therethrough with a helical edge engaging the external threaded portion to threadably connect the connector body and this member. The connector body passage is adapted to receive and telescopically pilot a tube end on opposite sides of an O-ring mounted in a groove in this passage. The O-ring is adapted to receive and peripherally seal the tube end. The nut and tube retainer has at least one integral retaining arm extending angularly inwardly toward the tube in the direction of entry thereof into the passage that terminates in a tip normally located in an interference position relative to the bead so as to be contacted and deflected outwardly thereby to permit continued entry of the tube end into the passage and after travel of the bead therepast to resume its interference position on the other side of the bead to retain the tube in the connector body.

6 Claims, 3 Drawing Sheets

QUICK CONNECT TUBE COUPLING

TECHNICAL FIELD

This invention relates to quick connect tube couplings employing an O-ring seal or the like and more particularly to those for connecting one tube to another or to a fluid vessel wall.

BACKGROUND OF THE INVENTION

In the simplest quick connect tube couplings for connecting one tube to another or to a fluid vessel wall, there is typically a threaded fitting arrangement to connect the coupling to a vessel wall and a retainer arrangement separate from any such threaded fitting arrangement to retain the coupling connection whether the latter is tube-to-tube or tube-to-vessel. Moreover, there is without added parts or complexity no allowance or adjustment for large tolerances that would affect sealing. For example, in the simplest couplings, it is common practice to contain the O-ring seal in an axial direction with an upset bead on the end of the tube that is inserted into the coupling and to also provide tube retention with this bead using some form of flexible detent such as one or more spring arms that receive the tube bead with a snap fit. Typically, these prior couplings comprise separate parts for the different functions. Moreover, the simplest designs generally provide tube support in only one location such that side-to-side movement can occur causing changes in the O-ring compression.

SUMMARY OF THE INVENTION

The present invention utilizes sheet metal to form a combination nut and tube retainer adaptable to coupling one tube to another or to a fluid vessel. For either case, the quick connect tube coupling comprises a connector body having an external threaded portion with a passage that extends therethrough. An O-ring is located in this passage and restrained against axial movement. A one-piece sheet metal nut and tube retainer member is formed so as to have an opening therethrough with threaded engaging portions that receive and engage the externally threaded portion to threadably connect the connector body and this member. A tube to be joined by the coupling is formed so as to have an upset annular bead adjacent one end thereof. The passage in the connector body is adapted to receive and telescopically pilot this one tube end on opposite sides of the O-ring while the latter effects sealing between the periphery of this tube end and the passage wall. An annular shoulder on the connector body contacts one of two oppositely facing sides of the tube bead to limit the entry of the tube into the passage. And the nut and tube retainer member operates to retain the tube in place. The latter function is effected by the nut and tube member being formed to have at least one integral elongated retaining arm that extends angularly inwardly toward the tube in the direction of entry thereto into the passage. The arm terminates in a tip that is normally located in an interference position relative to the tube bead so as to be contacted and deflected outwardly thereby on entry of the one tube end into the passage and after travel of the bead therepast to resume its interference position on the other side of the bead to thereby provide tube retention within a wide tolerance range as such does not affect the sealing function. In the case of coupling this one tube to another tube, the connector body is simply fixed to the end of the other tube which is formed to cooperate with an insert to receive and retain the O-ring. Alternatively, the connector body is adapted to cooperate with the nut portion of the nut and tube retainer member to connect the connector body in an opening in a wall of a fluid vessel to thus provide a quick connect coupling of the one tube with such vessel.

In both adaptations, a conventional O-ring seal or the like is used to create the required sealing action with the assembly of the fitting accomplished with a simple insertion of the one tube into the fitting whether the latter is affixed to another tube or to a wall of a liquid vessel. Furthermore, it will be appreciated that mechanical support for the one tube in the coupling is provided by the connector body on both sides of the O-ring thus assuring good piloting of this tube at assembly as well as limiting side-to-side movement of the tube and thereby changes in O-ring compression. Moreover, because conventional O-ring sealing is employed, i.e. sealing is effected at the outer and inner diameters of the O-ring rather than on axially opposite sides thereof, the coupling is not sensitive to large axial tolerances which can compromise or cause ineffective sealing where axial forces on the O-ring are required to seal. In the present invention, the tube retainer function plays no part in the sealing function though the retaining arms are integrally formed with the fitting for the connector body. In addition, the coupling requires few parts by combining the functions of multiple parts. Another feature is that the installation force requirements are readily modified with changes in the tube retainer arm geometry and which may include tuning so as to obtain an audible click and noticeable detent as the retaining arms engage the tube to alert the assembly operator that the connection has been properly made. Another feature is that the outside diameter of the coupling is minimized by the retaining arms being contained within the outer profile of the nut configuration. Still another feature is that the nut and tube retainer is adaptable for release with conventional tools such as a blade type screwdriver, pliers or a snap-ring tool or with a special tool that is receivable on the tube and is engageable with the retainer arms as described in more detail later.

These and other objects, advantages and features of the present invention will become more apparent from the following description and drawing in which:

Figure 1:
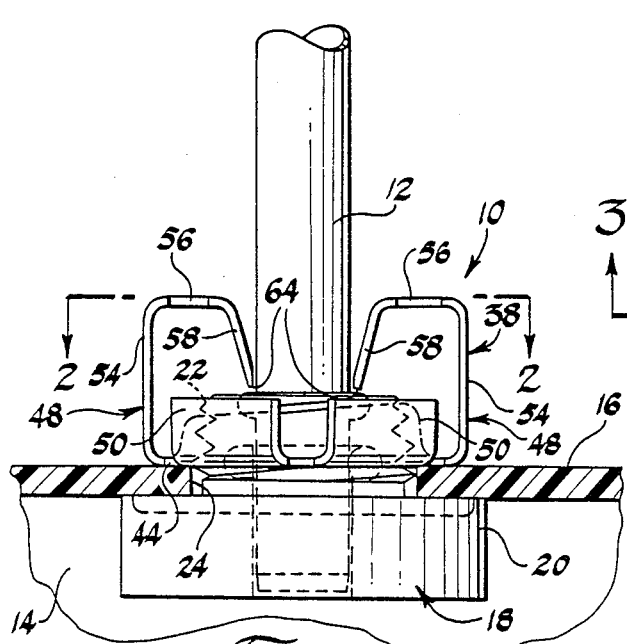
FIG. 1 is a side view of a quick connect tube coupling according to the present invention as adapted to connect a tube to a fluid vessel.
Figure 2:
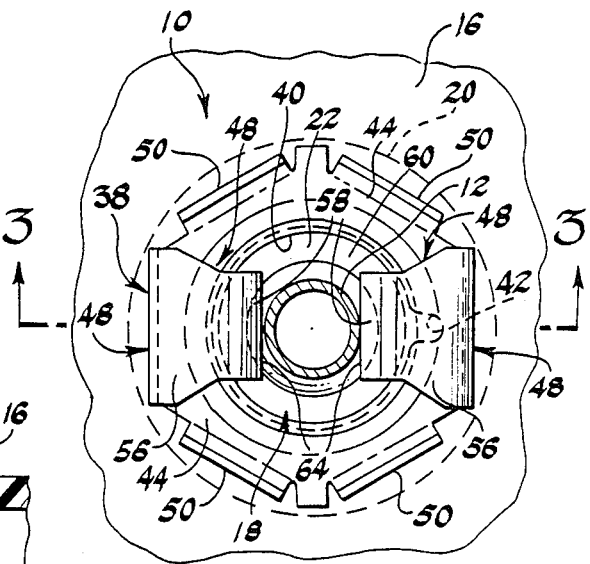
FIG. 2 is a view taken along the line 2—2 in FIG. 1.
Figure 3:
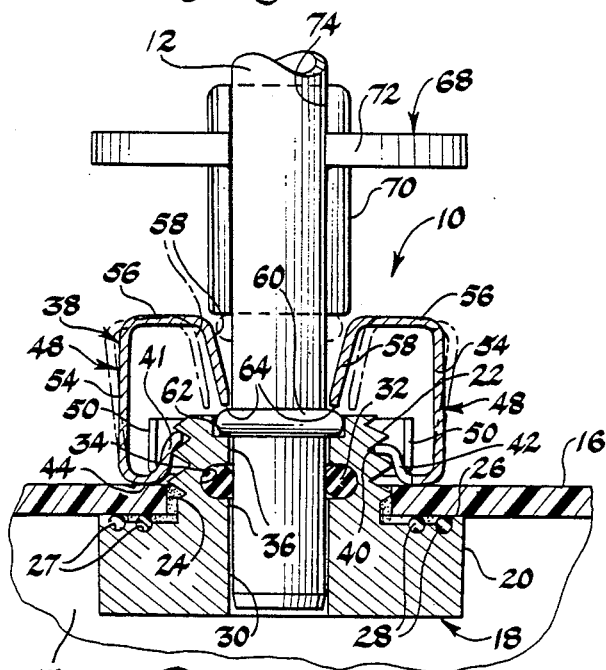
FIG. 3 is a view taken along the line 3—3 in FIG. 1 and has added thereto a special disassembly tool.

Referring to the drawings wherein the same numbers are used throughout the several views to identify the same or similar parts, there is shown in FIGS. 1-6 one embodiment of the quick connect tube coupling generally designated as 10 adapted to connect one end of a tube 12 to the interior 14 of a liquid vessel through its wall 16. However, it will also be understood that the coupling may also be connected interior of the vessel to another vessel, such as for example an automatic transmission oil cooler within a tank of a motor vehicle engine radiator. The quick connect tube coupling 10 comprises a connector body 18 having a cylindrical portion 20 that is located within the vessel and an externally threaded concentric portion 22 of smaller diameter that is received by and extends upwardly through an opening 24 in the vessel wall 16. The cylindrical portion 20 has a radially extending annular shoulder 26 and a pair of concentric grooves 27 located radially inwardly thereof in an axially recessed region. O-rings 28 are mounted in the respective grooves 27 and are caused to seal against the lower and internal side of the vessel wall 16 as seen in FIG. 3 on tightening of the fitting as described later. The connector body has a central cylindrical bore 30 extending therethrough and an O-ring 32 of circular cross-section is mounted in a radially outwardly extending annular groove 34 formed in this bore intermediate the ends thereof. The interposition of the O-ring groove 34 leaves cylindrical lands 36 of equal diameter on opposite sides of the O-ring which project slightly radially inwardly thereof in its normal or uncompressed state prior to insertion of the tube 12.

Figures 6, 7, 8:
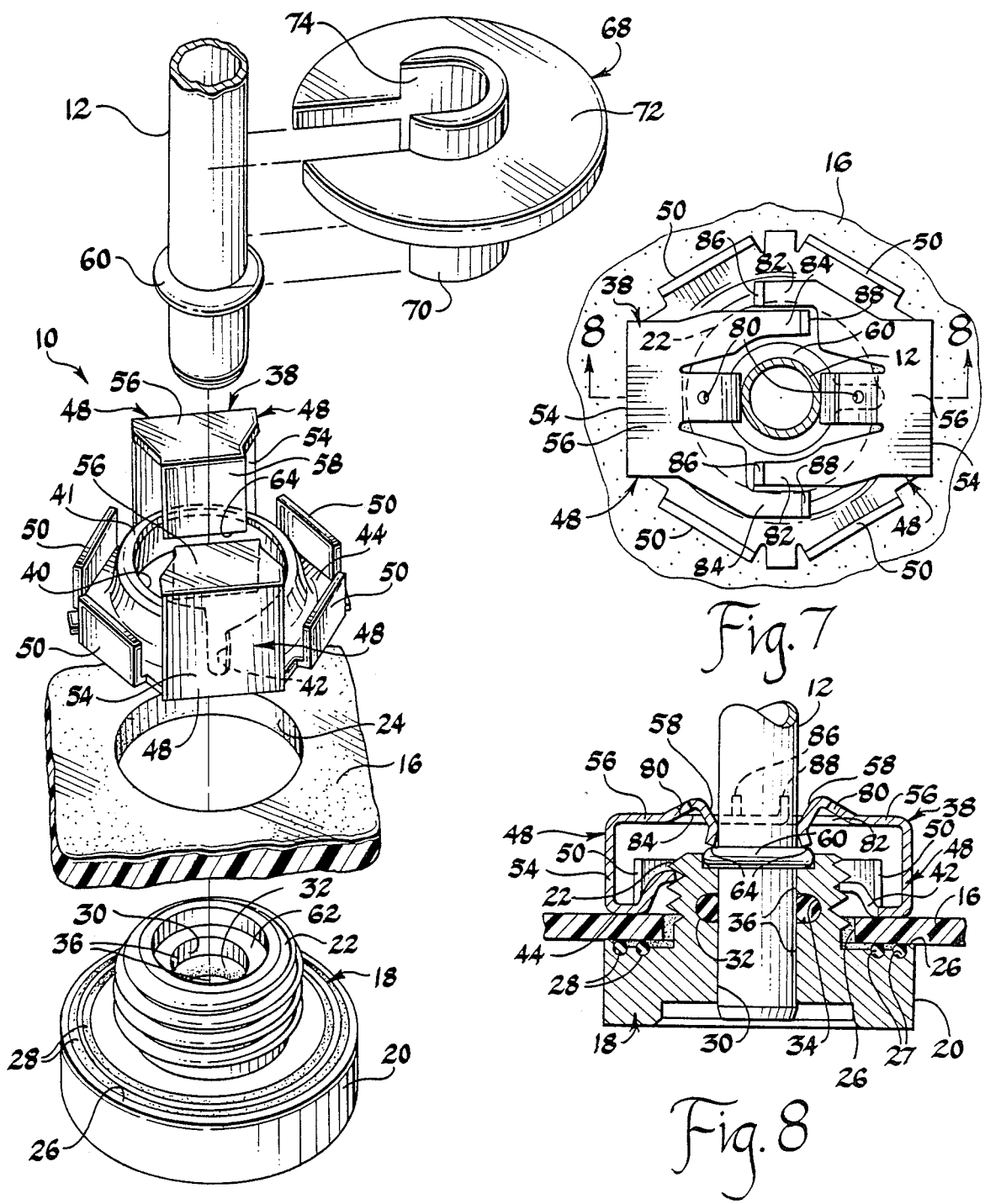
FIG. 6 is an exploded view of the coupling and tool in the figures.
FIG. 7 is a top view showing another embodiment of the nut and tube retainer of the present invention.
FIG. 8 is a view taken along the line 8—8 in FIG. 7.

A one-piece nut and tube retainer member 38 stamped from sheet metal has a central circular opening 40 by which it is adapted to be received on the threaded connector body portion 22. The edge 41 of the opening 40 is split by a U-shaped cutout 42 that allows it to be helically formed as best seen in FIG. 6 and thereby adapted to threadedly engage the threaded portion 22. The helically threaded edge 41 is upset from a radial shoulder 44 of the member 38 that is adapted to engage the exterior side of the vessel wall 16 opposite the shoulder 26 of the cylindrical body 20. A clearance hole for the tube 12 and a pair of nut forming and tube retaining arms 48 and four additional nut forming tabs 50 are also blanked from the sheet material with both the arms and tabs formed so as to define a hexagonal nut shape as viewed in top view in FIG. 2 or some other suitable drivable configuration. This nut formation adapts the retainer member 38 for engagement by a conventional wrench (e.g. open end, box, socket or special driver wrench, to tighten same on the connector body 18 against the vessel wall 16 and squeeze the O-rings 28 to thus retain the coupling 10 sealed thereto.

The retaining arms 48 are additionally formed each with a longitudinal section 54 that extends parallel to the axis of the fitting and a radial section 56 that extends radially inwardly and finally with a reverse bent section 58 that extends annularly inwardly toward the tube in the direction of entry thereof into the connector body passage 30. The end of the tube to be coupled is formed with an upset radially outwardly projecting annular bead 60 and the connector body passage by virtue of the lands 36 is adapted to receive and telescopically pilot the tube end on opposite sides of the O-ring 32 until the tube bead seats against a radial annular shoulder 62 formed by a counterbore in the upper end of the connector body bore 30.

Figure 4:
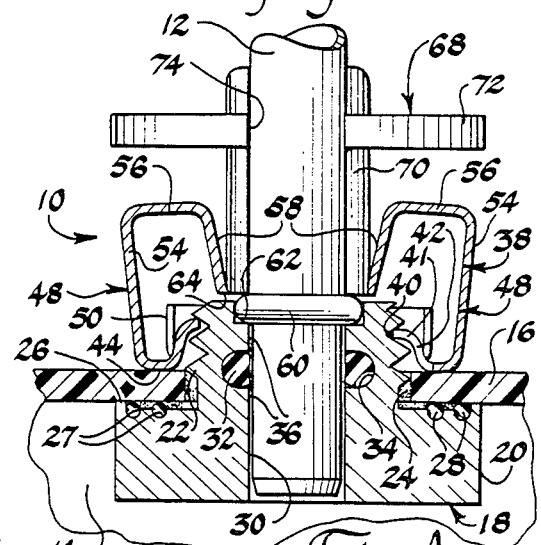
FIG. 4 is a view similar to FIG. 3 but showing the disassembly tool in operation.
Figure 5:
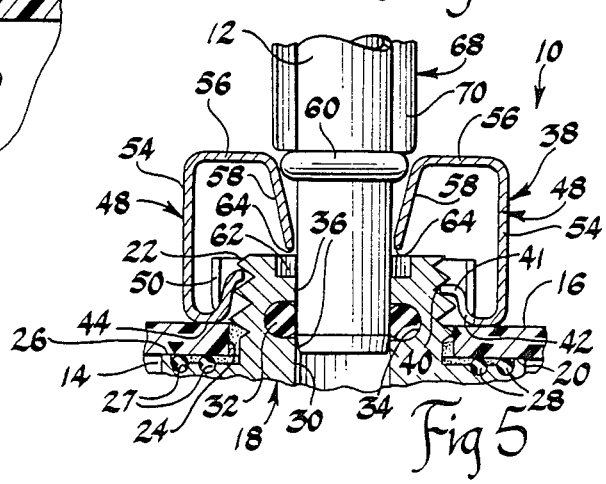
FIG. 5 is a view like FIG. 4 but fragmentary and showing the coupling following release of the tube.

The retaining arms 48 terminate at their reverse bent section 58 in a tip 64 that is diagonally opposite the other and normally located in an interference position relative to the tube bead 60. On insertion of the tube, the retaining arm tips 64 are contacted by the tube bead causing the entire retaining arm 48 to deflect outwardly as shown in phantom-line in FIG. 3 out of the way of the bead to allow entry of the tube into the passage 30 under the piloting of the lands 36. Then after travel of the tube bead past the arm tips 64, the retaining arms snap back and the tips resume their interference position on the other side of the bead as shown in FIG. 3. With the tube thus inserted, the O-ring 32 operates in conventional manner to effect sealing between the tube and connector body at the inner and outer diameters of the ring. The retaining arms 48 do not play any part in this tube sealing operation and only serve to prevent removal of the tube. For example, it is not necessary that the retaining arms bear against the tube bead to make the sealed connection as their purpose is tube retention in and not against the O-ring 32. Disassembly of the tube is accomplished by a special but simple tool 68. The tool 68 has a tubular body 70 with an enlarged diameter portion 72 which have an opening 74 through the side thereof that permits assembly of the tool on the tube above the nut and tube retainer member 38 as shown in FIG. 3. A downward or pushing force on the enlarged diameter portion 72 such as can be applied with a person's fingers is effective to force the tubular body 70 to spread the retaining arms as shown in FIG. 4 to release the tube bead from the arm tips and permit removal as shown in FIG. 5.

Two alternative forms of release but using conventional tools are shown in the embodiment in FIGS. 7 and 8. In one version, there is simply added a hole 80 in each of the radial arm sections 56 to permit the use of a conventional snap ring tool to spread the arms to release the tube by engagement with these holes which are located diagonally opposite each other at the same radius on opposite sides of the tube. In the other version, there is formed two pairs of overlapping release fingers 82 and 84 that extend outward from an alongside the radial arm sections 56 of the retaining arms and overlap with those extending from the other retaining arm and have upstanding tabs 86 and 88 that may be grasped and squeezed with a conventional pair of pliers on either side of the tube to thereby radially outwardly deflect the retaining arms to permit removal of the tube. Moreover, the tabs 86 and 88 are positioned so that when they align at maximum plier squeeze, they limit the deflection of the retaining arms to prevent them from being damaged by overspreading during tube removal.

Figure 9:
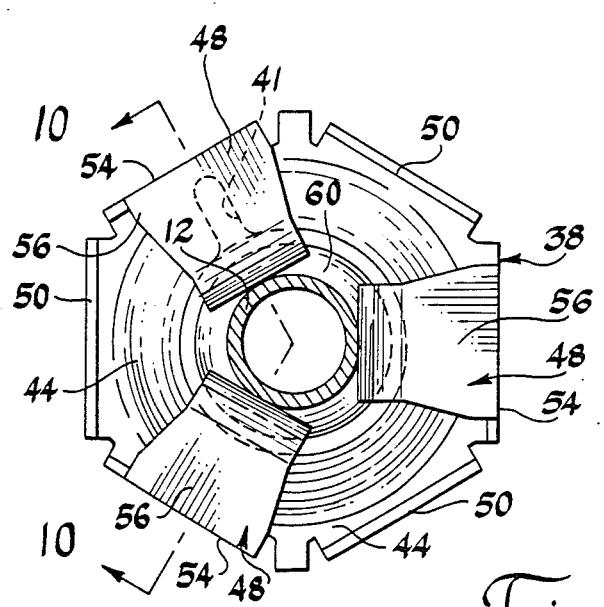
FIG. 9 a top view of another embodiment of the quick connect tube coupling according to the present invention as adapted to coupling two tubes together.
Figure 10:
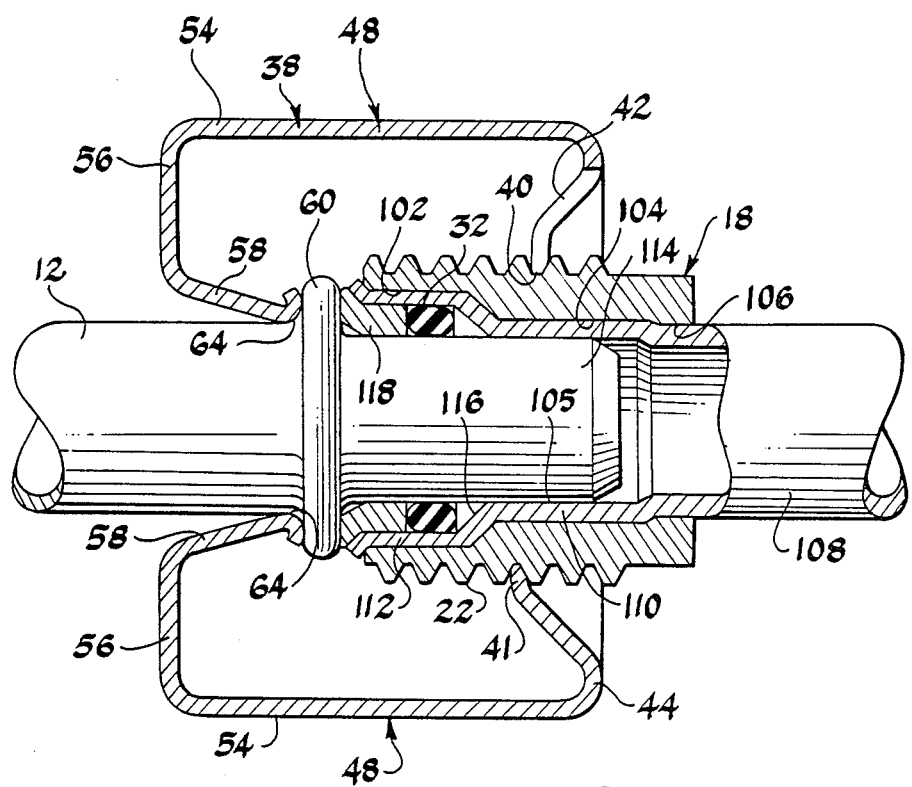
FIG. 10 is a view taken along the line 10—10 in FIG. 9.

Referring now to FIGS. 9 and 10, there is shown the quick connect tube coupling as adapted to sealingly connect two tubes. In this version, the connector body 18 is modified to have a central passage extending therethrough with three stepped diameter bore portions 102, 104 and 106 of progressively smaller diameter to improve tolerance control during manufacture and also to minimize pressure drop through the connector as will become more apparent. The smaller diameter portion 106 is sized to accept the normal outside diameter of one tube 108 to which tube 12 is now to be connected while the remaining portion of the tube 108 at this end is stepped outwardly at 110 and 112 to match the respective larger diameter bore portions 104 and 102 of the connector body. Moreover, the inner diameter 105 of the intermediate tube enlargement section 110 is made to correspond to a reduced diameter portion 114 now formed on the end of the inserted tube 12 while the upset bead 60 on the latter remains as before. The reduced outer diameter tube portion 114 and the enlarged inner diameter tube portion 112 provides space for the O-ring 32 which is now axially retained on the right hand side by the step 116 between the two enlarged tube sections 110 and 112 and on the left hand or opposite side by a collar 118 that is press-fitted in the large diameter tube section 112 and thereby fixed to the connector body through the tube 108 rather than being fixed directly thereto by integral formation therewith as in tne FIG. 1 embodiment. In addition, the collar 118 serves as a stop for the bead 58 in lieu of the shoulder provided on the connector body in the FIGS. 1-5 embodiment. In this case, the combination nut and retainer 10 may take the form of either the previously described embodiments or have an additional third retaining arm 48 and one less nut tab 50 as shown but now the nut portion of the retainer 38 serves only to connect the retainer to the connector body rather than also provide a securing function to a vessel wall as previously described. However, it will also be understood that the number of retaining arms may be anything between one (1) and the number of sides of the nut.

The above described preferred embodiments are illustrated of the invention which may be modified within the scope of the appended claims.

The embodiments of the invention in which an exclusive property or privilege is claimed are defined as follows:

1. A quick connect tube coupling comprising a connector body having an external threaded portion with a passage extending therethrough, an O-ring located in said passage, means restraining said O-ring against axial movement, a one-piece sheet metal nut and tube retainer member having an opening thurethrough and thread engaging means for respectively receiving and engaging said external threaded portion to threadably connect said connector body and said member, a tube having a radially outwardly projecting annular bead adjacent one end thereof, said passage adapted to receive and telescopically pilot said one tube end on opposite sides of said O-ring, said O-ring adapted to receive and peripherally seal said one tube end, and said nut and tube retainer member having at least one integral elongated retaining arm extending angularly inwardly toward said tube in the direction of entry thereof into said passage and terminating in a tip normally located in an interference position relative to said bead so as to be contacted and deflected outwardly thereby on entry of said one tube end into said passage and after travel of said bead therepast to resume said interference position to retain said tube in said connector body.

2. A quick connect tube coupling comprising a connector body having an external threaded portion with a passage extending therethrough, an O-ring located in said passage, means restraining said O-ring against axial movement, a one-piece sheet metal nut and tube retainer member having an opening therethrough with a helical edge engaging said external threaded portion to threadably connect said connector body and said member, a tube having a radially outwardly projecting annular bead adjacent one end thereof, said passage adapted to receive and telescopically pilot said one tube end on opposite sides of said O-ring, said O-ring adapted to receive and peripherally seal said one tube end, shoulder means fixed to said connector body for contacting with one of two oppositely facing sides of said tube bead to limit the entry of said one tube end into said passage, and said nut and tube retainer member having integral nut side forming portions extending from a radial shoulder portion surrounding said opening and also at least one integral elongated retaining arm extending from one of said nut side forming portions, said arm extending angularly inwardly toward said tube in the direction of entry thereof into said passage and terminating in a tip normally located in an interference position relative to said bead so as to be contacted and defleezed outwardly thereby on entry of said one tube end into said passage and after travel of said bead therepast to resume said interference position on the other side of said bead to retain said tube in said connector body.

3. A quick connect tube coupling comprising a connector body having an external threaded portion with a passage extending therethrough, an O-ring located in said passage, means restraining said O-ring against axial movement, a one-piece sheet metal nut and tube retainer member having an opening therethrough with a helical edge engaging said external threaded portion to threadably connect said connector body and said member, a tube having a radially outwardly projecting annular bead adjacent one end thereof, said passage adapted to receive and telescopically pilot said one tube end on opposite sides of said O-ring, said O-ring adapted to receive and peripherally seal said one tube end, an annular shoulder on said connector body extending about one end of said passage for contacting with one of two oppositely facing sides of said tube bead to limit the entry of said one tube end into said passage, and said nut and tube retainer member having a pair of integral elongated retaining arms located diagonally opposite each other and extending angularly inwardly toward said tube in the direction of entry thereof into said passage, said arms each terminating in a tip normally located in an interference position relative to said bead so as to be contacted and deflected outwardly thereby on entry of said one tube end into said passage and after travel of said bead therepast to resume said interference position on the other side of said bead to retain said tube in said connector body.

4. A quick connect tube coupling as defined in claim 3 wherein said arms have a radial section with a hole therein located diagonally opposite the hole in the other arm and adapted to be engaged by a conventional snap ring tool so as to spread said arms to permit removal of said tube.

5. A quick connect tube coupling as defined in claim 3 wherein at least one pair of overlapping release fingers integral with said nut and tube retainer member extend outward of and alongside said retaining arms in opposite directions and overlap with each other and have upstanding tabs adapted to be grasped and squeezed by a conventional pair of pliers so as to spread said arms to permit removal of said tube.

6. A quick connect tube coupling as defined in claim 5 wherein said tabs are positioned to align with each other when fully squeezed by said pliers to limit the spreading of said arms.

* * * * *